UNITED STATES PATENT OFFICE.

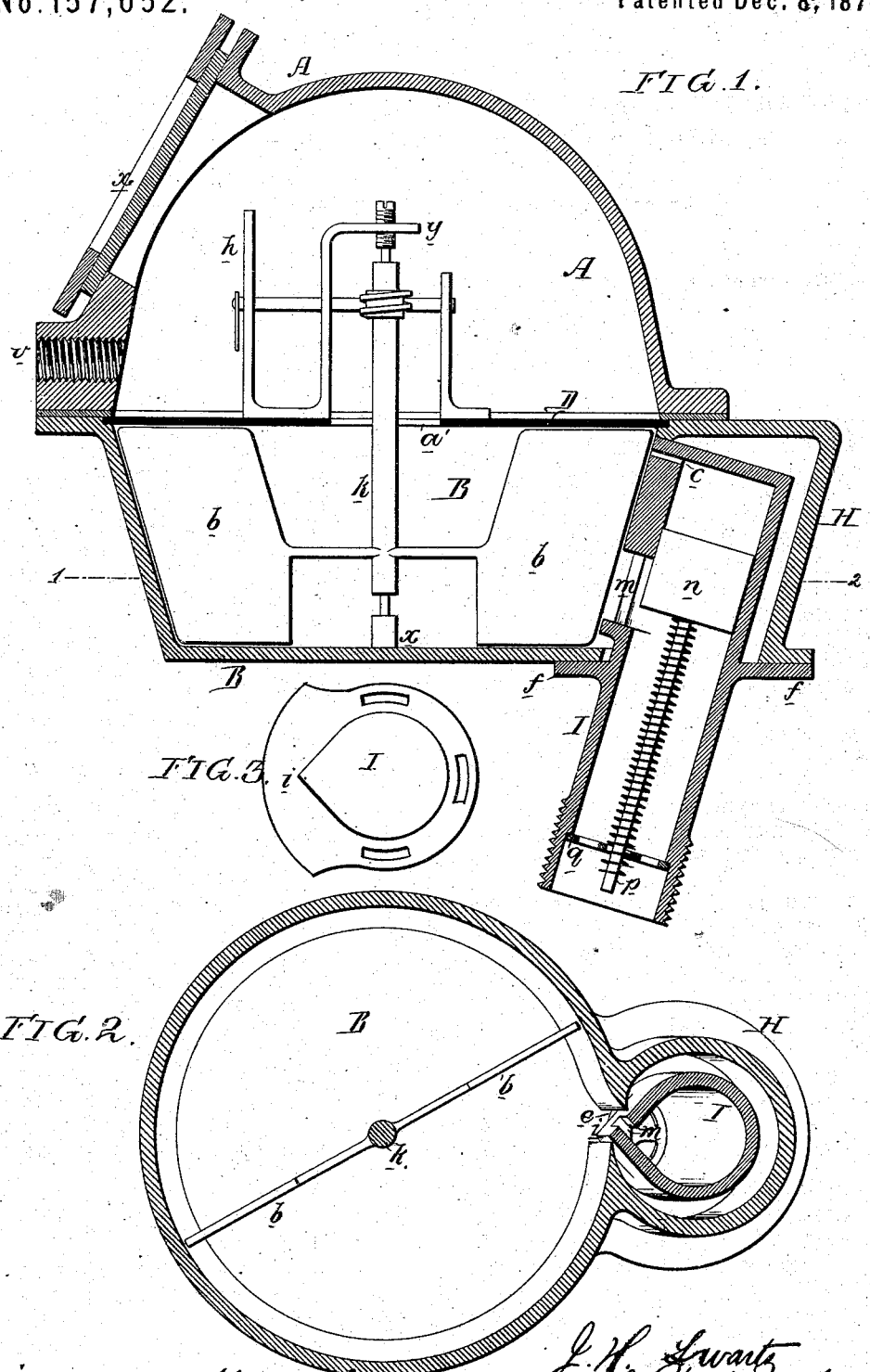

JOHN H. SWARTZ, WILLIAM P. RHODES, AND DE WITT C. TAYLOR, OF BROOKLYN, N. Y., ASSIGNORS TO DE WITT C. TAYLOR, OF SAME PLACE.

IMPROVEMENT IN WATER-METERS.

Specification forming part of Letters Patent No. 157,652, dated December 8, 1874; application filed April 28, 1874.

CASE 2.

*To all whom it may concern:*

Be it known that we, JOHN H. SWARTZ, WILLIAM P. RHODES, and DE WITT C. TAYLOR, of Brooklyn, Kings county, New York, have invented an Improvement in Water-Meters, of which the following is a specification:

Our invention relates to that class of water-meters in which a central-discharge water-wheel is caused to operate the indexes, the patent of John Sheffield, No. 47,866, May 23, 1865, and his patent No. 87,118, of February 23, 1869, affording examples of wheels of this class; and the object of our invention is to simplify the construction of instruments of this class, and to insure sensitiveness of action.

In the accompanying drawing, Figure 1 is a vertical section of our improved water-meter; and Fig. 2, a sectional plan on the line 1-2, Fig. 1.

The outer casing of the meter consists of the upper portion A and lower portion B, separated from each other by a diaphragm, D, having a central opening, $a'$, the whole being properly secured together by bolts or screws adapted to external flanges. The lower portion of the casing is, by preference, made of the tapering form represented in Fig. 1, and the vanes $b\ b$ of the wheel (two, in the present instance) are made to conform to this shape, and to revolve as close as possible to the inclined sides, as well as to the top and bottom of the wheel-chamber, without being in absolute contact therewith. On one side of the wheel-chamber, and communicating therewith through an opening, $e$, is a chamber, H, for the reception of the upper portion of the inlet-pipe I, which has a flange, $f$, tightly secured to the under side of the casing by bolts, which pass through segmental slots in the flange, thereby permitting the lateral adjustment of the inlet-pipe, for a purpose explained hereafter. The portion of this pipe which projects into the chamber H is, by preference, made of the form best observed in the detached view, one side of the pipe having an angular rib, $i$, which projects into and nearly through the opening $e$ between the wheel-chamber and chamber H, and in one side of this angular rib a slot, $m$, is made, in a direction, by preference, tangential with the inner circumference of the inlet-pipe, as shown in the plan view. In place of the slot or orifice $m$ there may be a number of holes, but I prefer the slot. The angular rib on the inlet-pipe is not essential to our invention, as the opening or openings may be made in a round pipe, but the flat sides afforded by the projection permit the easy formation of the tangential slot. A cylindrical valve, $n$, is contained within the inlet-pipe I, the rod $p$ of this valve passing through a transverse guide, $q$, to which is attached a spring surrounding the rod, and connected to the valve, the said spring having a tendency to depress the valve. The vertical spindle of the wheel has its lower bearing in the central step $x$, and its upper bearing on an adjustable pin in a stand, $y$, secured to the diaphragm D; and motion is communicated to the indicating mechanism from the shaft through any suitable system of gearing, the said indicating mechanism consisting of the usual dials, pointers, and gearing. We place the dials in the vertical or nearly vertical position shown by the dial-plate $h$, so that no sediment can rest thereon, and to the upper portion of the casing is secured a pane, X, of glass, through which the dials can be seen. This arrangement of dial-plates offers less obstruction to the course of the water from the central opening $a'$ of the diaphragm to the outlet $v$ than the dial arrangement of other meters of this class.

An important feature of our invention is the lateral adjustability of the inlet-pipe, as it permits such a variation in the direction of the water into the meter as circumstances may require.

At or near the extreme upper end of the inlet-pipe is a vent-hole, $c$, through which, whatever water may pass, the valve shall be discharged into the wheel-chamber and not interfere with the delicate action of the said valve, which will yield to the pressure of water, and expose more or less of the opening $m$, as circumstances may require, any suitable device being used for preventing the movement of the valve beyond certain limits.

It will be seen that, as the waste-water flows forcibly into the wheel-chamber, it is measured with the other water, so that an accurate record of the entire volume admitted to the meter is obtained.

We claim as our invention—

1. The inlet-pipe I, combined with the casing, substantially as described, so as to admit of lateral adjustment, for the purpose specified.

2. The combination of the inlet-pipe I, its opening $m$, inclosed spring-valve $n$, and the vent $c$.

In testimony whereof we have signed our names to this specification in the presence of two subscribing witnesses.

JOHN H. SWARTZ.
WM. P. RHODES.
DE WITT C. TAYLOR.

Witnesses:
THOMAS H. TEASE,
CHARLES S. ENSIGN.